US006751953B2

(12) United States Patent
Mentink et al.

(10) Patent No.: US 6,751,953 B2
(45) Date of Patent: Jun. 22, 2004

(54) HYDRAULIC ACTUATING DEVICE FOR A CLOSURE ASSEMBLY

(75) Inventors: Laurentius Andreas Gerardus Mentink, Haaksbergen (NL); Willem Herman Masseling, Oldenzaal (NL); Daniël van 't Veen, Borne (NL)

(73) Assignee: Actuant Corporation, Glendale, WI (US)

( * ) Notice: Subject to any disclaimer, the term of this patent is extended or adjusted under 35 U.S.C. 154(b) by 68 days.

(21) Appl. No.: 10/260,884

(22) Filed: Sep. 30, 2002

(65) Prior Publication Data

US 2003/0061811 A1 Apr. 3, 2003

(30) Foreign Application Priority Data

Oct. 1, 2001 (NL) ............................................ 1019067

(51) Int. Cl.[7] ................................................ F16D 31/02
(52) U.S. Cl. ........................................... 60/431; 60/476
(58) Field of Search .......................... 60/476, 431, 475, 60/468

(56) References Cited

U.S. PATENT DOCUMENTS

| | | | |
|---|---|---|---|
| 1,134,608 A | 4/1915 | Gottschalk | |
| 3,916,567 A | 11/1975 | Daugirdas | |
| 4,263,746 A | 4/1981 | Eller et al. | |
| 5,760,695 A | 6/1998 | Huber | |
| 6,470,678 B1 * | 10/2002 | Huber | 60/476 |

FOREIGN PATENT DOCUMENTS

| | | |
|---|---|---|
| DE | 42 41 764 A1 | 6/1994 |
| DE | 196 41 428 C1 | 2/1998 |
| DE | 199 06 728 A1 | 11/1999 |
| EP | 0 803 630 A2 | 10/1997 |
| NL | 7103556 | 9/1972 |
| NL | 1011362 C2 | 8/2000 |
| NL | 1014476 C2 | 8/2001 |
| WO | WO 01/06078 A1 | 1/2001 |
| WO | WO 01/62532 A1 | 8/2001 |

* cited by examiner

*Primary Examiner*—Edward K. Look
*Assistant Examiner*—Michael Leslie
(74) *Attorney, Agent, or Firm*—Quarles & Brady LLP

(57) ABSTRACT

A hydraulic actuating device for a closure assembly, for example of a vehicle, which closure assembly comprises a closure element which can be moved between a closed position, in which the closure element closes off an opening, and an opened position.

The hydraulic actuating device comprises a hydraulic actuator for moving the closure element, which actuator has a housing having a closing chamber and an opening chamber. Further provided are a hydraulic pump having an associated electric pump motor and a reservoir for hydraulic fluid.

The hydraulic actuating device further comprises a first pressure-limit valve, which is connected to the opening chamber, and a second pressure-limit valve, which is connected to the closing chamber. Control means are further provided for controlling the supply of hydraulic fluid under pressure to the opening chamber or to the closing chamber of the actuator.

A hydraulic flow sensor connected to the control means is provided at each pressure-limit valve, such that the one or more hydraulic flow sensors detect the presence of a flow of hydraulic fluid through the pressure-limit valve to the reservoir.

The control means are adapted—if a flow sensor detects a flow of hydraulic fluid—to reverse the supply of hydraulic fluid under pressure to the actuator, so that the opening motion is changed to a closing motion or vice versa.

18 Claims, 5 Drawing Sheets

HYDRAULIC ACTUATING DEVICE FOR A CLOSURE ASSEMBLY

FIELD OF THE INVENTION

The present invention relates to a hydraulic actuating device for a closure assembly. The present invention also relates to a closure assembly provided with an hydraulic actuating device, and a vehicle provided with a bodywork and a closure element for closing off an opening in the bodywork provided with an hydraulic actuator.

BACKGROUND OF THE INVENTION

Various hydraulically actuated closure assemblies are known from the prior art. By way of example, reference is here made to DE 196 41 428, EP 0 803 630 and NL 1011362.

In these known closure assemblies, various solutions are proposed with regard to the risk of an object or body part becoming jammed as the closure element is closed and the risk of a motion of the closure element being obstructed, for example because the closure element, as it is opened, collides with something.

Especially with regard to the jamming of a body part, there is the requirement not only for the maximum force which can be delivered by the actuator to be heavily reduced during the last part of the closing motion and/or for the closing motion to be halted, but also for the motion of the closure element to be reversed so that the jammed body part is freed. The known hydraulically actuated closure assemblies do not provide any such automatic reversal.

OBJECT OF THE INVENTION

The invention sets out to provide a hydraulic operating device for a closure assembly by which the above-stated object can be achieved, which actuating device is simply constructed and highly reliable.

SUMMARY OF THE INVENTION

The invention provides a hydraulic actuating device for a closure assembly, which is characterized in that a hydraulic flow sensor connected to the control means is provided at each pressure-limit valve, such that the one or more hydraulic flow sensors detect the presence of a flow of hydraulic fluid through the pressure-limit valve to the reservoir, and in that the control means are set up—if a flow sensor detects a flow of hydraulic fluid—to reverse the supply of hydraulic fluid under pressure to the actuator, so that the opening motion is changed to a closing motion or vice versa.

The invention envisages that the exceeding of the permitted pressure value in the opening chamber or the closing chamber, which pressure value is set by a pressure-limit valve, leads to the opening of the pressure-limit valve in question and the discharge of fluid to the reservoir. By detecting this discharge by means of a hydraulic flow sensor, the control means establish that the maximum limit value for the pressure has been exceeded. The control means then react by reversing the direction of motion of the actuator.

The flow sensor can be realized in various ways, but is preferably of an embodiment as described in NL 1014476 of the applicant is provided.

Preferably, it is envisaged that a single hydraulic flow sensor common to all pressure-limit valves is provided, which detects the presence of a flow from each of the pressure-limit valves to the reservoir.

Preferably, the hydraulic flow sensor form a free passage for the fluid through the reservoir line, so that the limitation of the pressure in the opening chamber and closing chamber by an associated pressure-limit valve is always operative. In the event of failure of the flow sensor or the control means, only the intended reversal of the direction of motion would then remain undone.

The solution according to the invention is considerably more advantageous than the use of costly electrical pressure sensors for measuring the pressure in the opening chamber and the closing chamber. Moreover, the control means are less complex than in combination with pressure sensors.

In a simple variant, the first and second pressure-limit valves connect to a common reservoir line to the reservoir and the hydraulic flow sensor is installed in the common reservoir line. The limit values for the pressures which lead to the opening of the various pressure-limit valves are, in practice, advantageously varied.

In a preferred embodiment, it is envisaged that the actuator has a by-pass connection, which, at a by-pass mouth, connects to the cylinder space, which by-pass mouth lies between the connecting mouths of the opening chamber and the closing chamber. A third pressure-limit valve is further provided, which connects to the by-pass connection, so that, in a first range of the closing motion, the closing chamber is only connected to the associated connection and is closed off from the by-pass connection, and so that, in a second range, the closing chamber is connected both to the associated connection and to the by-pass connection.

By realizing the third pressure-limit valve such that this valve opens at a lower pressure than the second pressure-limit valve, it is achieved that in the second range of the closing motion the force which can be delivered by the actuator is less than in the first range.

In a practical embodiment of the variant described above, it is envisaged that the first, second and third pressure-limit valves connect to a common reservoir line to the reservoir and that the hydraulic flow sensor is installed at this common reservoir line.

This solution gives rise to the effect that, in a first range of the opening motion, the force which can be delivered by the actuator is determined by the first pressure-limit valve and, in a second range, by the third pressure-limit valve. If the third-pressure limit valve opens at a lower pressure value, the force which can be delivered by the actuator in the second range of the opening motion is thus less than in the first range. Depending on the further embodiment of the closure assembly, this can be acceptable. If this reduction is undesirable or inadmissible, the invention proposes a further, more complex embodiment.

In this more complex embodiment, it is envisaged that the second and third pressure-limit valves as well as the connection of the opening chamber connect, via a non-return valve closing in the direction of the opening chamber, to a common reservoir line, in which the hydraulic flow sensor and, between the flow sensor and the reservoir, the first pressure-limit valve are accommodated, the common line between the flow sensor and the first pressure-limit valve connecting, via a non-return valve closing in the direction of the reservoir line, to the opening chamber. By this embodiment it is achieved that the pressure in the opening chamber is only limited by the first pressure-limit valve, even when the mouth of the by-pass connection is connected to the opening chamber. During closure, the by-pass connection, together with the associated third pressure-limit valve, is operative. This effect can also be achieved, though, with other hydraulic circuits.

The invention as well as advantageous embodiments thereof will be explained in greater detail below with reference to the drawing.

DESCRIPTION OF PREFERRED EMBODIMENTS

Figure 1:
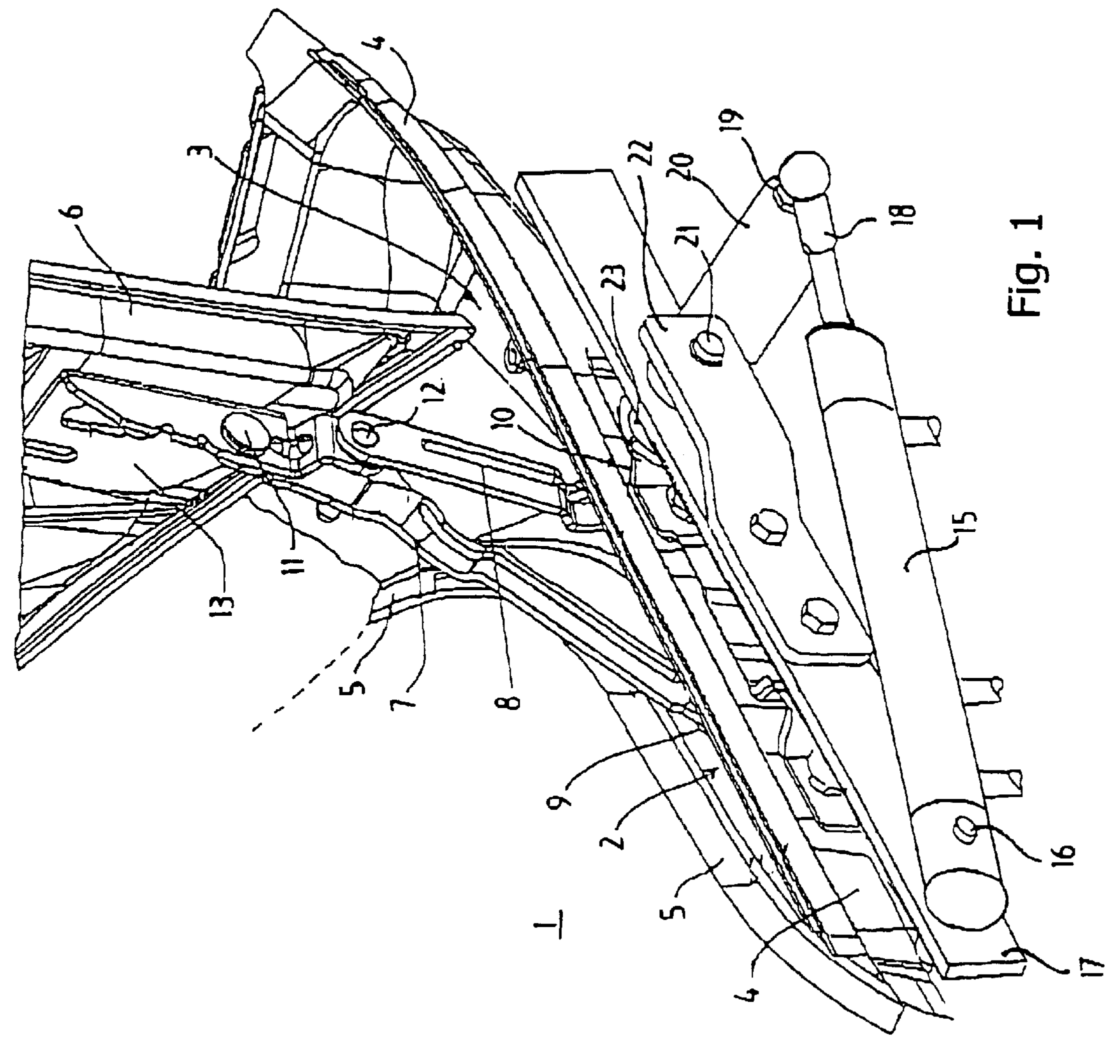
FIG. 1 shows in perspective view a portion of a vehicle according to the present invention.

FIG. 1 shows a part of the right-hand rear side of a passenger vehicle (not illustrated further) with boot. As is commonly known, that portion of the vehicle body comprises a boot opening 1, the bodywork forming a drip rail 2 which extends along the side edge, and generally the top edge, of this boot opening 1 and is recessed. The drip rail has a rail bottom wall 3, which on one side is delimited by a rail wall 4. On the other side, the rail bottom 3 is delimited by a vertical inner rail wall 5, which is provided with flexible sealing strip (not shown) extending along its top side.

As is also usual, the vehicle further has a boot lid 6 for closing off the opening 1 of the boot space.

The boot lid 6 is fastened to the vehicle body by hinge means, such that it can be pivoted about a substantially horizontal pivot axis line, and is movable between a closed position thereof, in which the boot lid 6 bears against the sealing strip on the inner rail wall 5 (so that the boot space is sealed off from the outside atmosphere), and an opened position (shown in FIG. 1) directed upwards at an angle relative to the closed position.

In this example, the hinge means comprise on each side edge of the boot lid 6 two rods 7, 8, which each at their one end are pivotably connected by an associated hinge point 9, 10 to the vehicle body and at their other end by an associated hinge point 11, 12 respectively to a support 13 fitted to the bottom side of the boot lid 6. In a manner which is known per se, these two rods 7, 8 form with their associated hinge points a so-called four-rod hinge construction. The rods 7, 8 are installed and realized such that, in the closed position of the boot lid 6, these rods 7, 8 lie in the drip rail 2.

For the opening and closing of the boot opening 1, the vehicle is further provided with a hydraulic actuating device, a number of exemplary embodiments of which will be explained in greater detail with reference to FIGS. 2, 3, 4.

The actuating device comprises, inter alia, a double-acting hydraulic drive cylinder 15, which is installed between the vehicle body and the boot lid for the movement of the boot lid 6.

The cylinder 15 has a cylinder housing, which, on the bottom side, is pivotably connected, by a pin 16, to a support structure 17, which is in turn fastened on the inner side of the bodywork to the vertical drip rail wall 4.

The cylinder 15 has a piston rod 18, which can be moved to and from and which is connected by a ball joint 19 to the end of a lever 20. At the other end, this lever 20 is fixedly connected to a shaft 21 extending transversely to the lever 20. The shaft 21 projects at one end through an additional support 22 and projects in the other direction through the support 17 and then through an opening 23 in the rail wall 4, which opening is provided with a sealing ring, into the drip rail 2. The part of the shaft 21 which projects into the drip rail 2 forms the hinge point 10 of the rod 8 and is fixedly connected to this rod 8.

Figure 2:
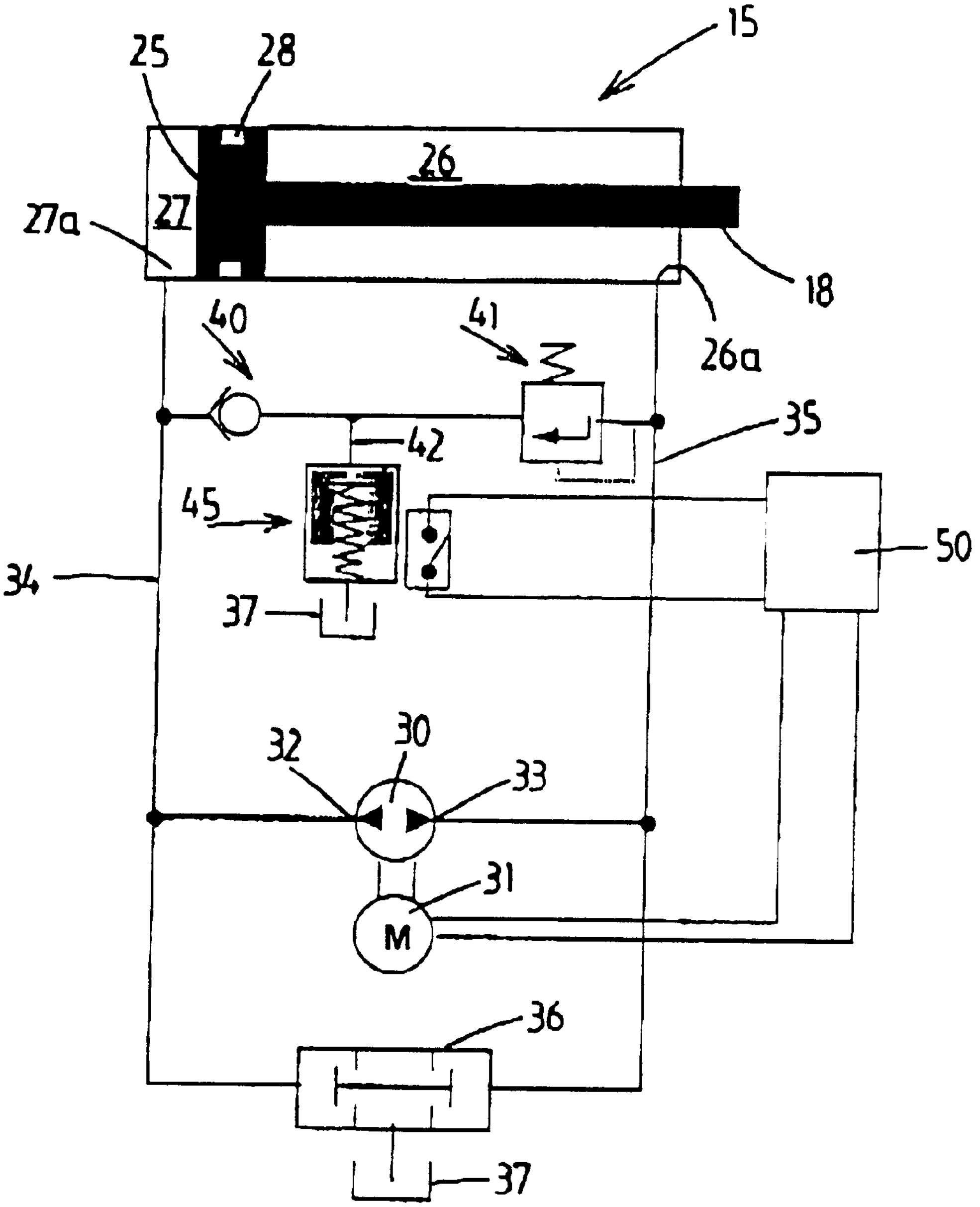
FIG. 2 shows diagrammatically a first exemplary embodiment of the hydraulic operating device according to the invention.

In FIG. 2, the hydraulic actuator 15 for moving the boot lid 1 can be recognized, which actuator 15 has a housing having a cylinder space, in which a piston rod 18 with piston 25 can be moved to and from, which latter delimits in the cylinder space a closing chamber 26 and an opening chamber 27.

The housing of the actuator 15 is provided in each of the chambers 26, 27 with an associated mouth 26*a*, 27*a*, connecting to the cylinder space, for the supply and discharge of hydraulic fluid. Around the piston 25 lies a sealing ring 28, which connects in a seal-tight manner to the housing.

The hydraulic actuating device further comprises a hydraulic pump 30 having an associated electric pump motor 31.

The pump 30 is a pump having reversible pumping direction and having two ports 32, 33, which, depending on the direction of rotation of the pump motor 31, act as a suction port or delivery port.

The port 32 in connected by a line 34 to the opening chamber 27 and the port 33 is connected by a line 35 to the closing chamber 26.

The ports 32, 33 are further connected by a two-way suction valve 36 to a reservoir 37 for hydraulic fluid.

When hydraulic fluid is supplied to the closing chamber 26, the actuator 15 delivers a force so as to make the boot lid 1 perform a closing motion into the closed position and, when the supply is directed to the opening chamber 27, delivers a force so as to make the boot lid perform an opening motion into the opened position.

The hydraulic actuating device further comprises a first pressure-limit valve 40, which is connected to the opening chamber 27, and a second pressure-limit valve 41, which is connected to the closing chamber 26. Electrical control means 50 for controlling the supply of hydraulic fluid under pressure to the opening chamber 27 or to the closing chamber 26 of the actuator 15, by suitable driving of the pump 15, are further provided.

It will be clear to the person skilled in the art that use could also be made of a pump having a single delivery port and of an (electronically operated) control valve for controlling the supply of hydraulic fluid to the chambers of the actuators. In such an embodiment (not shown), but also in other variants, it can be envisaged that the first and second pressure-limit valves coincide and are thus formed by a single pressure-limit valve, which is connected, for example by an OR valve, to the closing chamber and the opening chamber.

The first and second pressure-limit valves 40, 41 connect to a common reservoir line 42 to the reservoir 37.

In the common reservoir line 42, a hydraulic flow sensor 45 is installed.

The flow sensor 45 is connected to control means 50 for the electric motor 31 of the pump 30. The sensor 45 is adapted to detect the presence of a flow of hydraulic fluid, both through the first pressure-limit valve 40 and through the second pressure-limit valve 41, to the reservoir 37.

The control means 50 are adapted—if the flow sensor 45 detects a flow of hydraulic fluid to the reservoir 37—to reverse the supply of hydraulic fluid under pressure to the actuator 15 by effecting a reversal of the direction of rotation of the electric motor 31. If the sensor 45 detects a flow during the opening motion, this opening motion is interrupted and the closing motion is automatically performed. This can be the case, for example, if the boot lid meets an obstacle as it is opened. If a hand or the like becomes jammed as the boot lid is closed, this will also lead to a reversal of the motion and hence to the removal of the jamming.

The flow sensor 45 can be of a embodiment which is known per se, for example as shown in NL 1014476 of the applicant. This known embodiment will here be explained, for the sake of completeness, with reference to FIG. 5. Totally different flow sensors can also, of course, be used for establishing a fluid flow in the common reservoir line.

In the embodiment according to FIG. 2, the maximum deliverable force of the actuator 15 during the closing motion and the opening motion is constant. In practice, the limit values for the pressure at which the valves 40, 41 open can vary. For example, the valve 40 opens at a pressure of 70 bar and the valve 41 at a pressure of 80 bar.

The embodiment according to FIG. 2 will in practice provide an acceptable protection against jamming of a body part if the clamping force ultimately acting upon the body part in question has an acceptable value.

An alternative embodiment of the hydraulic actuating device will now be explained with reference to FIG. 3. In FIG. 3, parts which are consistent with parts according to FIG. 2 are provided with the same reference numerals.

Figure 3:
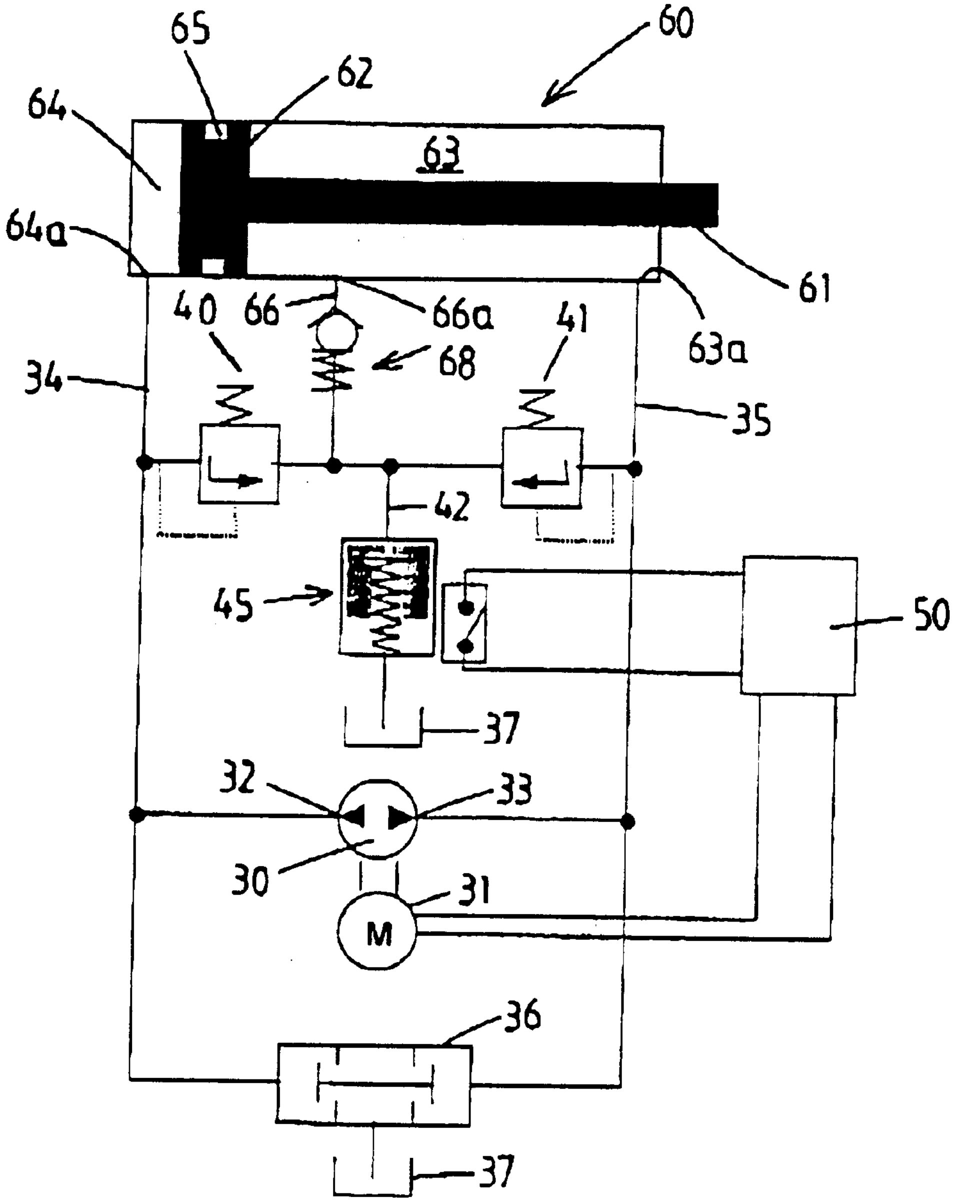
FIG. 3 shows diagrammatically a second exemplary embodiment of the hydraulic operating device according to the invention.

In the device according to FIG. 3, an actuator 60 is used instead of the actuator 15.

The actuator 60 has a housing having a cylinder space, in which a piston rod 61 with piston 62 can be moved to and fro, which latter delimits in the cylinder space a closing chamber 63 and opening chamber 64.

The housing of the actuator 60 is provided in each of the chambers 63, 64 with an associated mouth 63*a*, 64*a*, connecting to the cylinder space, for the supply and discharge of the hydraulic fluid.

Around the piston 62 lies a sealing ring 65, which connects in a seal-tight manner to the housing.

Moreover, the actuator 60 is provided with a by-pass connection 66, which, at a by-pass mouth 66*a*, connects to the cylinder space, which by-pass mouth 66*a* lies between the connecting mouths 63*a*, 64*a* of the opening chamber 64 and the closing chamber 63. In particular, the by-pass mouth 66*a* lies closer to the mouth 64*a* of the opening chamber 64 than to the mouth 63*a*.

In the device according to FIG. 3, a third pressure-limit valve 68 is provided, which connects to the by-pass connection 66. Further, the first, second and third pressure-limit valves 40, 41, 68 connect to the common reservoir line 42 to the reservoir 37.

In a first range of the closing motion, the closing chamber 63 is only connected to the associated mouth 63*a* and the closing chamber 63 is closed off from the by-pass mouth 66*a*. In a following second range of the closing motion, the closing chamber 63 is connected both to the associated mouth 63*a* and to the by-pass mouth 66*a*.

In practice, this has the advantage that the limit value for the pressure at which the valve 68 opens is lower than the limit values of the valves 40, 41. For example, the valve 68 opens at a pressure of 20 bar, the valve 40 at 70 bar and the valve 41 at 80 bar.

As a result of this embodiment, during the first range of the closing motion a maximum pressure of 80 bar is available for the closing motion. If this limit value is exceeded, for example because a suitcase is preventing the boot lid from closing, the valve 41 will open and fluid will flow via the line 42 to the reservoir. The sensor 45 detects this and the boot lid will automatically proceed to perform an opening motion.

During the second range of the closing motion, the maximum available pressure in the closing chamber is only 20 bar. If this pressure is exceeded, for example because a hand is jammed by the boot lid, the valve 68 opens and the flow through the line 42 is detected by means of a sensor 45. On the one hand, the clamping force is now low because the pressure is limited to 20 bar and, on the other hand, the motion of the boot lid is reversed, so that the slightly jammed hand is freed right away.

It will be clear that the location of the mouth 66*a* and the limit values for the valves 40, 41, 68 can be defined by the person skilled in the art on the basis of the embodiment of the total construction and the requirements regarding, for example, the clamping force which is deemed admissible.

In a variant (not shown), it is likewise conceivable for a plurality of by-pass mouths, each with an associated pressure-limit valve to be provided, so that more than two ranges can be defined, each having a separate maximum limit value.

In the embodiment of FIG. 3, the maximum pressure in the opening chamber 64 in a first range of the opening motion is 70 bar. After the sealing ring 65 has passed the by-pass mouth 66*a*, the maximum pressure in the second range of the opening motion is limited to 20 bar. In practice this can be acceptable, but it is conceivable that insufficient force is then present to complete the opening motion. In order to resolve this "conflict" between a low clamping force in the closing motion, on the one hand, and a suitable pressure during the opening motion, on the other hand, the more complex embodiment according to FIG. 4 is provided.

Figure 4:
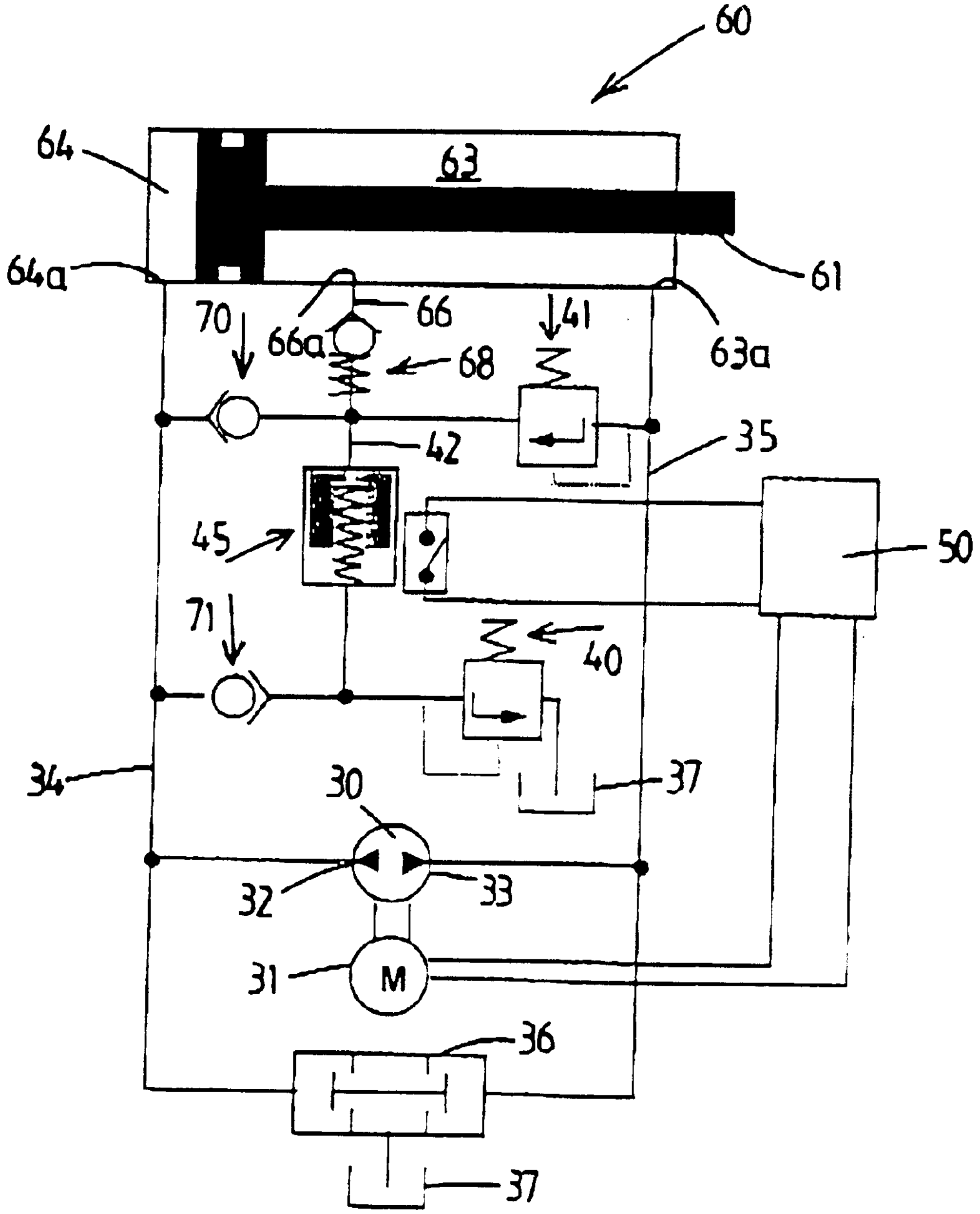
FIG. 4 shows diagrammatically a third exemplary embodiment of the hydraulic operating device according to the invention.

In FIG. 4, parts which are consistent with the embodiment of the hydraulic actuating device according to FIG. 3 are provided with the same reference numerals.

In the embodiment according to FIG. 4, the second and third pressure-limit valves 41, 68 and the connection of the opening chamber 64 connect, via a non-return valve 70 closing in the direction of the opening chamber, to the common reservoir line 42 to the reservoir 37.

In the line 42, the hydraulic flow sensor 45, and between the flow sensor 45 and the reservoir 37, the first pressure-limit valve 40 are accommodated.

Between the flow sensor 45 and the first pressure-limit valve 40, the common line 42 further connects, via a non-return valve 71 closing in the direction of the reservoir line 42, to the opening chamber 64.

In the embodiment according to FIG. 4, too, it is preferable if the third pressure-limit valve 68 opens at a lower pressure than the first and second pressure-limit valves 40, 41. For example, the valve 68 opens at 20 bar, the valve 40 at 70 bar and the valve 41 at 80 bar.

As a result of the embodiment according to FIG. 4, the maximum pressure during a first range of the closing motion is 80 bar and during a second range 20 bar. During the opening motion, the maximum pressure is always 70 bar.

It will be clear that the hydraulic actuating device according to the invention is suitable for all kinds of closure assemblies having a hydraulically driven closure element. For example, a so-called fifth door of a motor vehicle can be considered, which fifth door often in its closed position stands almost vertically. It will further be clear that the present invention can also be applicable, for example, to the doors and bonnet of a motor vehicle, or, for example, to a tonneau cover over an other part in a cabriolet-type vehicle. Applications are also conceivable outside the automotive industry, such as for lift doors, aircraft, ship's hatches, etc.

A possible embodiment of the sensor 45 will be explained with reference to FIG. 5.

Figure 5:
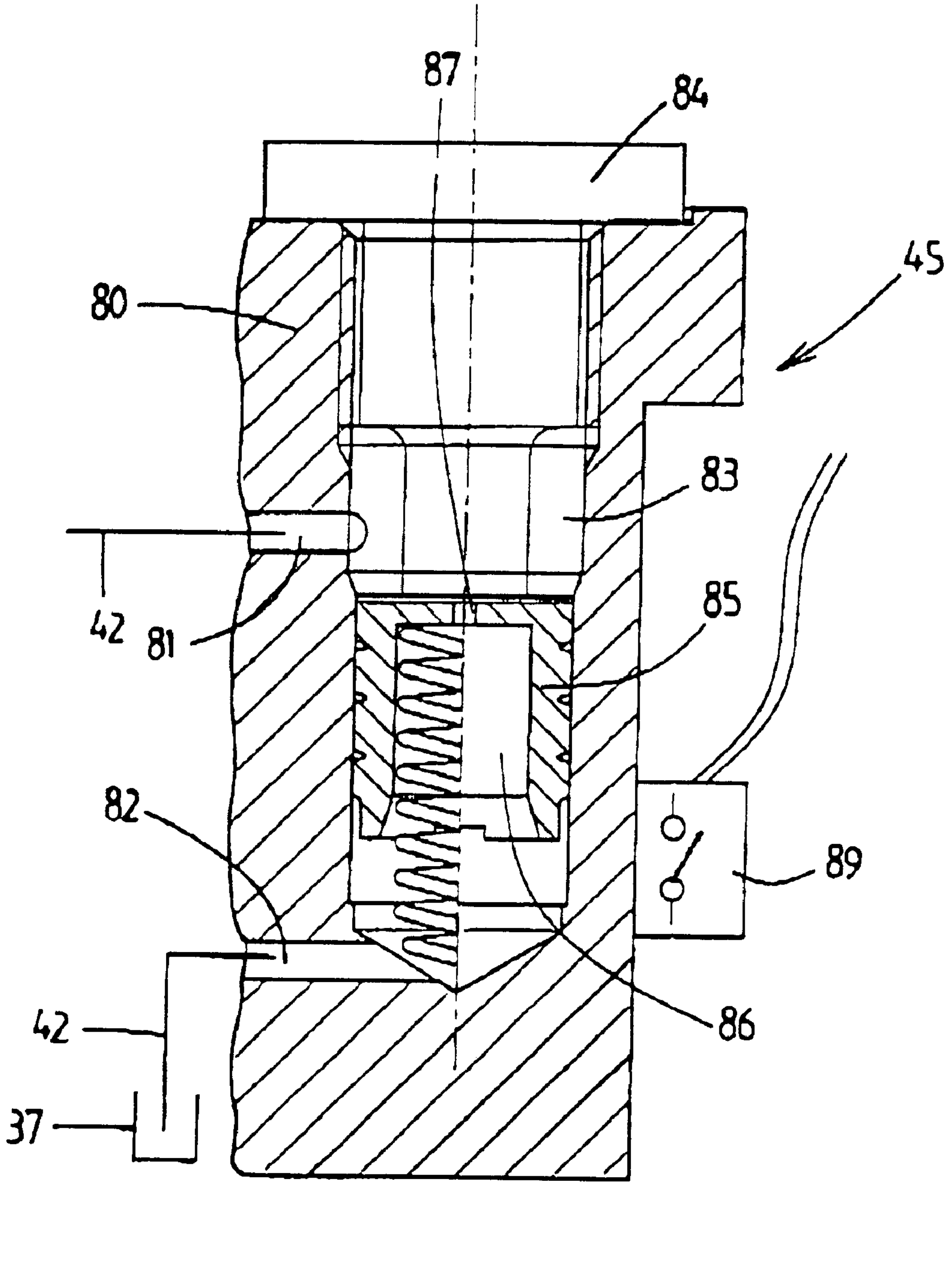
FIG. 5 shows in cross section an exemplary embodiment of the hydraulic flow sensor which can be applied in the hydraulic actuating device according to the invention.

FIG. 5 shows a part of a housing 80, for example of a block in which the pressure-limit valves and any other valves of the hydraulic actuating device are further accommodated. The housing 80 is made of aluminum or some other non-magnetic material.

In the housing 80 a bore 83 is provided, to which an inlet port 81 and an outlet port 82 connect. The bore 83 is closed off by a plug 84.

Between the ports 81, 82 a slide member 85 is arranged such that it is displaceable within the bore 83, which slide member has a through-duct 86 provided with an orifice 87.

A resetting spring 88 forces the slide member 85 in the direction of the plug 84.

The ports 81, 82 constitute part of the common reservoir line 42, such that, when fluid flows through this line to the reservoir 37, the resistance generated by the orifice 87 moves the slide member 85, counter to the spring 88, in the direction away from the plug 84.

A magnetic field sensor 89, for example a Hall sensor, detects this displacement of the slide member 85 under the influence of the flow and delivers a signal to the control means 50.

What is claimed is:

1. Hydraulic actuating device for a closure assembly, which closure assembly comprises a closure element which is moveable between a closed position, in which the closure element closes off an opening, and an opened position, which hydraulic actuating device comprises:

a hydraulic actuator for moving the closure element, which actuator has a housing having a cylinder space, in which a piston/piston rod assembly is moveable to and fro, which latter, in the cylinder space, delimits a closing chamber and opening chamber, the housing being provided in each of the chambers with an associated mouth, connecting to the cylinder space, for the supply and discharge of hydraulic fluid, a hydraulic pump having an associated electric pump motor, which pump has one or more delivery ports for the delivery of hydraulic fluid under pressure, a reservoir for hydraulic fluid, wherein, when hydraulic fluid is supplied to the closing chamber, the actuator delivers a force so as to make the closure element perform a closing motion towards the closed position and, when the supply is directed to the opening chamber, delivers a force so as to make the closure element perform an opening motion towards the opened position, wherein the hydraulic actuating device further comprises a first pressure-limit valve, which is connected to the opening chamber, and a second pressure-limit valve, which is connected to the closing chamber, and wherein electrical control means are further provided for controlling the supply of hydraulic fluid under pressure to the opening chamber or to the closing chamber of the actuator, wherein a hydraulic flow sensor connected to the electrical control means is provided at each pressure-limit valve, such that the one or more hydraulic flow sensors detect the presence of a flow of hydraulic fluid through the pressure-limit valve to the reservoir, and wherein the electrical control means are adapted—if a flow sensor detects a flow of hydraulic fluid—to reverse the supply of hydraulic fluid under pressure to the actuator, so that the opening motion is changed to a closing motion or vice versa.

2. Hydraulic actuating device according to claim 1, wherein a single hydraulic flow sensor common to all pressure-limit valves is provided, which detects the presence of a flow from each of the pressure-limit valves to the reservoir.

3. Hydraulic actuating device according to claim 1, wherein a single hydraulic flow sensor common to all pressure-limit valves is provided, which detects the presence of a flow from each of the pressure-limit valves to the reservoir, and the first and second pressure-limit valves connect to a common reservoir line to the reservoir and the common hydraulic flow sensor is installed at the common reservoir line.

4. Hydraulic actuating device for a closure assembly, which closure assembly comprises a closure element which is moveable between a closed position, in which the closure element closes off an opening, and an opened position, which hydraulic actuating device comprises:

a hydraulic actuator for moving the closure element, which actuator has a housing having a cylinder space, in which a piston/piston rod assembly is moveable to and fro, which latter, in the cylinder space, delimits a closing chamber and opening chamber, the housing being provided in each of the chambers with an associated mouth, connecting to the cylinder space, for the supply and discharge of hydraulic fluid, a hydraulic pump having an associated electric pump motor, which pump has one or more delivery ports for the delivery of hydraulic fluid under pressure, a reservoir for hydraulic fluid, wherein, when hydraulic fluid is supplied to the closing chamber, the actuator delivers a force so as to make the closure element perform a closing motion towards the closed position and, when the supply is directed to the opening chamber, delivers a force so as to make the closure element perform an opening motion towards the opened position, wherein the hydraulic actuating device further comprises a first pressure-limit valve, which is connected to the opening chamber, and a second pressure-limit valve, which is connected to the closing chamber, and wherein electrical control means are further provided for controlling the supply of hydraulic fluid under pressure to the opening chamber or to the closing chamber of the actuator, wherein a hydraulic flow sensor connected to the electrical control means is provided at each pressure-limit valve, such that the one or more hydraulic flow sensors detect the presence of a flow of hydraulic fluid through the pressure-limit valve to the reservoir, and wherein the electrical control means are adapted—if a flow sensor detects a flow of hydraulic fluid—to reverse the supply of hydraulic fluid under pressure to the actuator, so that the opening motion is changed to a closing motion or vice versa, and wherein the actuator is further provided with at least one by-pass connection, which, at a by-pass mouth, connects to the cylinder space, which by-pass mouth lies between the connecting mouths of the opening chamber and the closing chamber, and wherein a third pressure-limit valve is provided, which connects to the by-pass connection, so that, in a first range of the closing motion, the closing chamber is only connected to the associated mouth and is closed off from the by-pass mouth, and so that, in a second range, the closing chamber is connected both to the associated mouth and to the by-pass mouth.

5. Hydraulic actuating device according to claim 4, wherein a single hydraulic flow sensor common to all pressure-limit valves is provided, which detects the presence of a flow from each of the pressure-limit valves to the reservoir.

6. Hydraulic actuating device according to claim 4, wherein the first, second and third pressure-limit valves connect to a common reservoir line to the reservoir and the hydraulic flow sensor is installed at the common reservoir line.

7. Hydraulic actuating device according to claim 4, wherein the first, second and third pressure-limit valves connect to a common reservoir line to the reservoir and the hydraulic flow sensor is installed at the common reservoir line, and wherein a single hydraulic flow sensor common to all pressure-limit valves is provided, which detects the presence of a flow from each of the pressure-limit valves to the reservoir.

8. Hydraulic actuating device according to claim 4, wherein the second and third pressure-limit valves as well as the connection of the opening chamber connect, via a non-return valve closing in the direction of the opening chamber, to a common reservoir line, in which the hydraulic flow sensor and, between the flow sensor and the reservoir, the first pressure-limit valve are accommodated, the common line between the flow sensor and the first pressure-limit valve connecting, via a non-return valve closing in the direction of the reservoir line, to the opening chamber.

9. Hydraulic actuating device according to claim 4, wherein the second and third pressure-limit valves as well as the connection of the opening chamber connect, via a non-return valve closing in the direction of the opening chamber, to a common reservoir line, in which the hydraulic flow sensor and, between the flow sensor and the reservoir, the first pressure-limit valve are accommodated, the common line between the flow sensor and the first pressure-limit valve connecting, via a non-return valve closing in the direction of the reservoir line, to the opening chamber, and wherein a single hydraulic flow sensor common to all pressure-limit valves is provided, which detects the presence of a flow from each of the pressure-limit valves to the reservoir.

10. Hydraulic actuating device according to claim 4, wherein the third pressure-limit valve opens at a lower pressure than the first and second pressure-limit valves.

11. Hydraulic actuating device according to claim 4, wherein the third pressure-limit valve opens at a lower pressure than the first and second pressure-limit valves, and wherein a single hydraulic flow sensor common to all pressure-limit valves is provided, which detects the presence of a flow from each of the pressure-limit valves to the reservoir.

12. Hydraulic actuating device according to claim 4, wherein the third pressure-limit valve opens at a lower pressure than the first and second pressure-limit valves, and wherein the first, second and third pressure-limit valves connect to a common reservoir line to the reservoir and the hydraulic flow sensor is installed at the common reservoir line.

13. Hydraulic actuating device according to claim 4, wherein the third pressure-limit valve opens at a lower pressure than the first and second pressure-limit valves, and wherein a single hydraulic flow sensor common to all pressure-limit valves is provided, which detects the presence of a flow from each of the pressure-limit valves to the reservoir, wherein the first, second and third pressure-limit valves connect to a common reservoir line to the reservoir and the hydraulic flow sensor is installed at the common reservoir line.

14. Hydraulic actuating device according to claim 4, wherein the third pressure-limit valve opens at a lower pressure than the first and second pressure-limit valves, wherein the second and third pressure-limit valves as well as the connection of the opening chamber connect, via a non-return valve closing in the direction of the opening chamber, to a common reservoir line, in which the hydraulic flow sensor and, between the flow sensor and the reservoir, the first pressure-limit valve are accommodated, the common line between the flow sensor and the first pressure-limit valve connecting, via a non-return valve closing in the direction of the reservoir line, to the opening chamber.

15. Hydraulic actuating device according to claim 4, wherein the third pressure-limit valve opens at a lower pressure than the first and second pressure-limit valves, and wherein a single hydraulic flow sensor common to all pressure-limit valves is provided, which detects the presence of a flow from each of the pressure-limit valves to the reservoir, wherein the second and third pressure-limit valves as well as the connection of the opening chamber connect, via a non-return valve closing in the direction of the opening chamber, to a common reservoir line, in which the hydraulic flow sensor and, between the flow sensor and the reservoir, the first pressure-limit valve are accommodated, the common line between the flow sensor and the first pressure-limit valve connecting, via a non-return valve closing in the direction of the reservoir line, to the opening chamber.

16. Hydraulic actuating device according to claim 1, wherein the pump is a pump having reversible pumping direction and having two ports, which, depending on the direction of rotation of the pump motor, act as a suction port or delivery port, which ports are respectively connected to the opening chamber and the closing chamber.

17. Closure assembly provided with a hydraulic actuating device according to claim 1.

18. Vehicle provided with a bodywork and a closure element for closing off an opening in the bodywork, provided with a hydraulic actuating device according to claim 1.

* * * * *